United States Patent
Kosaka

(10) Patent No.: US 10,917,554 B2
(45) Date of Patent: Feb. 9, 2021

(54) LENS APPARATUS, IMAGE CAPTURING APPARATUS, CAMERA SYSTEM, DETERMINATION METHOD OF CORRECTION VALUE AND STORAGE MEDIUM

(71) Applicant: CANON KABUSHIKI KAISHA, Tokyo (JP)

(72) Inventor: Yuichi Kosaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/366,011

(22) Filed: Mar. 27, 2019

(65) Prior Publication Data
US 2019/0306406 A1 Oct. 3, 2019

(30) Foreign Application Priority Data
Apr. 2, 2018 (JP) ................. 2018-070516

(51) Int. Cl.
*H04N 5/232* (2006.01)
*G02B 7/04* (2021.01)
*H04N 5/225* (2006.01)

(52) U.S. Cl.
CPC ........... *H04N 5/23212* (2013.01); *G02B 7/04* (2013.01); *H04N 5/2254* (2013.01)

(58) Field of Classification Search
CPC ................................ H04N 5/23212
USPC ........................................................ 348/345
See application file for complete search history.

(56) References Cited

U.S. PATENT DOCUMENTS

2011/0243539 A1* 10/2011 Nakamura ............. G02B 7/282
  396/80
2016/0127637 A1* 5/2016 Takao ............... H04N 5/232122
  348/208.12

FOREIGN PATENT DOCUMENTS

JP 2016090815 A 5/2016

* cited by examiner

*Primary Examiner* — Joel W Fosselman
(74) *Attorney, Agent, or Firm* — Carter, DeLuca & Farrell LLP

(57) ABSTRACT

A lens apparatus detachably attachable to an image capturing apparatus including a focus detection unit having a focus detection optical system and performing focus detection process, and a controller controlling driving of a focusing lens unit based on a result of the focus detection process, via an extender including an extender optical system, includes an image capturing optical system including the focusing lens unit, and a determination unit determining a first correction value used for correcting the result of the focus detection process. When the lens apparatus is attached to the image capturing apparatus via the extender, the determination unit determines the first correction value using first information regarding a diameter of a pupil of the focus detection optical system and second information regarding a diameter of a pupil of an optical system including the image capturing optical system and the extender optical system.

23 Claims, 11 Drawing Sheets

|  | NO EXTENDER | 1.4-POWER EXTENDER | 2.0-POWER EXTENDER |
|---|---|---|---|
| DETECTED FOCUS POSITION | NO CHANGE | NO CHANGE | CHANGE TO POSITIVE VALUE LARGELY |
| MTF PEAK POSITION (FOCUS POSITION) | CHANGE TO POSITIVE VALUE | CHANGE TO POSITIVE VALUE | CHANGE TO POSITIVE VALUE |
| FOCUS CORRECTION VALUE | CHANGE TO NEGATIVE VALUE | CHANGE TO NEGATIVE VALUE | CHANGE TO POSITIVE VALUE |

LENS APPARATUS, IMAGE CAPTURING APPARATUS, CAMERA SYSTEM, DETERMINATION METHOD OF CORRECTION VALUE AND STORAGE MEDIUM

BACKGROUND OF THE INVENTION

Field of the Invention

The present invention relates to a lens apparatus, an image capturing apparatus, a camera system, a determination method of a correction value, and a storage medium.

Description of the Related Art

A method for improving accuracy of autofocus (hereinafter referred to as AF) by a phase detection when an extender (rear conversion lens) is used has been proposed. Japanese Patent Laid-Open No. ("JP") 2016-90815 discloses an image capturing apparatus using a value obtained by multiplying a magnification of an extender by a focus correction value of a single lens when the extender is not attached as a focus correction value when the extender is attached.

FIGS. 10A to 10C show a relationship between a light flux AF pupil, which is used in a phase difference AF, and an image capturing light flux. FIGS. 10A to 10C respectively show a case in which an extender is not attached, a case in which a 1.4-power extender is attached, and a case in which a 2.0-power extender is attached. FIGS. 11A to 11C show a spherical aberration of an image capturing lens. The solid line is the spherical aberration at a wavelength (about 530 nm) of the image capturing light flux, and the broken line is the spherical aberration at a wavelength (about 700 nm) of an AF light flux. FIGS. 11A to 11C respectively correspond to FIGS. 10A to 10C. The light flux used for the phase difference AF becomes farther from an optical axis as the magnification of the extender becomes higher. When the 2.0-power extender is attached, the image capturing light flux becomes thin, and the light flux of the outer peripheral portion in the image capturing light flux is used in the phase difference AF as shown in FIG. 10C. In FIGS. 11A to 11C, portions used in the phase difference AF is circled. Since the light flux of the outer peripheral portion is a light flux that passed through a portion where the spherical aberration is large, the phase difference AF after the extender is attached is likely to be affected by the spherical aberration fluctuation due to an object distance, zooming and a manufacturing error and the like, compared with the phase difference AF when the extender is not attached.

FIG. 12 shows changes in a detected focus position, an MTF peak position, and a focus correction value (a difference between the detected focus position and the MTF peak position) when the spherical aberration fluctuates behind an image capturing surface. When the extender is not attached or when the 1.4-power extender is attached, the light flux that passed through a portion where the spherical aberration is small is used in the phase difference AF, and thus the detected focus position does not fluctuate greatly. Also, the MTF peak position moves behind the image capturing surface. Accordingly, the focus correction value becomes a negative value. On the other hand, when the 2.0-power extender is attached, the detected focus position fluctuates largely in the positive direction with respect to the change in the MTF peak position, and thus the focus correction value becomes a positive value.

If positive and negative signs of the focus correction value are reversed according to whether or not the extender is attached, using the focus correction value, which is calculated based on the focus correction value when the extender is not attached, when the extender is attached similarly to JP 2016-90815 becomes an inverse correction, and the focus is largely deviated. To prevent this, the lens apparatus or the image capturing apparatus may store the focus correction value when the extender is attached, but a measuring equipment to measure the manufacturing error for each apparatus is required, and cost increases.

SUMMARY OF THE INVENTION

The present invention provides a lens apparatus, an image capturing apparatus, a camera system, a correction value determination method, and a storage medium capable of reducing defocus when an extender is attached.

A lens apparatus as one aspect of the present invention is detachably attachable to an image capturing apparatus, which includes a focus detection unit having a focus detection optical system and configured to perform a focus detection process by a phase detection, and a controller configured to control driving of a focusing lens unit based on a result of the focus detection process by the focus detection unit, via an extender including an extender optical system. The lens apparatus includes an image capturing optical system having the focusing lens unit, and a first determination unit configured to determines a first correction value used when the controller corrects the result of the focus detection process. When the lens apparatus is attached to the image capturing apparatus via the extender, the first determination unit determines the first correction value based on first information regarding a diameter of a pupil of the focus detection optical system and second information regarding a diameter of a pupil of an optical system including the image capturing optical system and the extender optical system.

An image capturing apparatus as another aspect of the present invention is detachably attachable to a lens apparatus, which includes an image capturing optical system having a focusing lens unit, via an extender including an extender optical system. The image capturing apparatus includes a focus detection unit having a focus detection optical system and configured to perform a focus detection process by a phase detection, and a controller configured to control driving of the focusing lens unit based on a result of the focus detection process by the focus detection unit. When the lens apparatus is attached to the image capturing apparatus via the extender, the controller determines a first correction value used for correcting the result of the focus detection process based on first information regarding a diameter of a pupil of the focus detection optical system and second information regarding a diameter of a pupil of an optical system including the image capturing optical system and the extender optical system.

A camera system as another aspect of the present invention includes a lens apparatus, an extender, and an image capturing apparatus to which the lens apparatus is detachably attached via the extender. The lens apparatus includes an image capturing optical system having the focusing lens unit and a first determination unit configured to determine a first correction value used when a controller corrects a result of a focus detection process. The extender includes an extender optical system. The image capturing apparatus includes a focus detection unit having a focus detection optical system and configured to perform the focus detection process by a phase detection, and the controller configured to control driving of the focusing lens unit based on the result of the focus detection process by the focus detection unit. When the lens apparatus is attached to the image capturing apparatus via the extender, the first determination unit determines the first correction value based on first information regarding a diameter of a pupil of the focus detection optical system and second information regarding a diameter of a pupil of an optical system including the image capturing optical system and the extender optical system.

A determination method as another aspect of the present invention determines a first correction value used when a controller corrects a result of a focus detection process where the lens apparatus, which includes an image capturing optical system having a focusing lens unit, is attached to an image capturing apparatus, which includes a focus detection unit having a focus detection optical system and configured to perform the focus detection process by a phase detection and the controller configured to that control driving of the focusing lens unit based on the result of the focus detection process by the focus detection unit, via an extender including an extender optical system The determination method includes the steps of obtaining first information regarding a diameter of a pupil of the focus detection optical system, obtaining second information regarding a diameter of a pupil of an optical system including the image capturing optical system and the extender optical system, and determining the first correction value based on the first information and the second information.

A non-transitory computer-readable storage medium as another aspect of the present invention stores a computer program to enable a computer to perform a determination method configured to determine a first correction value used when a controller corrects a result of a focus detection process where the lens apparatus, which includes an image capturing optical system having a focusing lens unit, is attached to an image capturing apparatus, which includes a focus detection unit having a focus detection optical system and configured to perform the focus detection process by a phase detection and the controller configured to control driving of the focusing lens unit based on the result of the focus detection process by the focus detection unit, via an extender including an extender optical system. The determination method comprising the steps of obtaining first information regarding a diameter of a pupil of the focus detection optical system, obtaining second information regarding a diameter of a pupil of an optical system including the image capturing optical system and the extender optical system, and determining the first correction value based on the first information and the second information.

Further features of the present invention will become apparent from the following description of exemplary embodiments with reference to the attached drawings.

DESCRIPTION OF THE EMBODIMENTS

Figure 1:
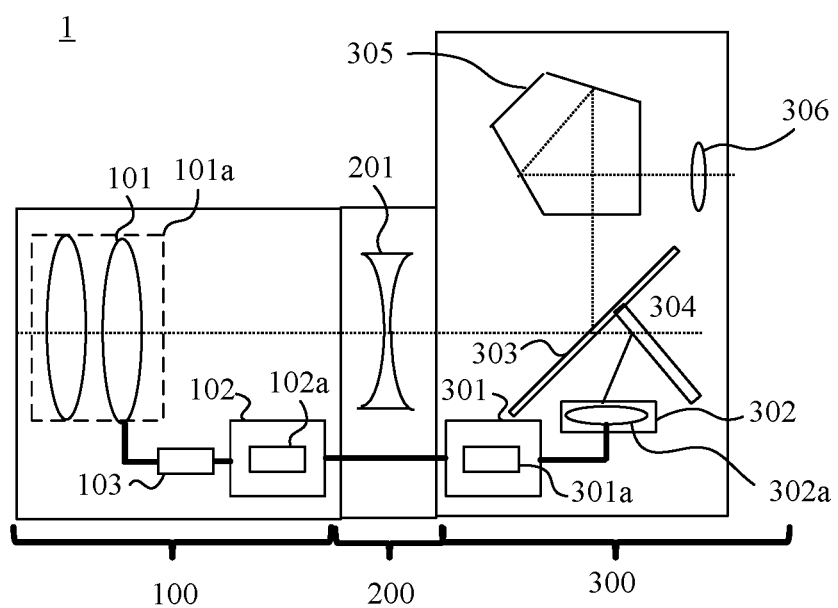
FIG. 1 is a configuration diagram of a camera system according to an embodiment of the present invention.

Referring now to the accompanying drawings, a detailed description will be given of embodiments according to the present invention. In each figure, the same components will be designated by the same reference numerals, and a duplicate description thereof will be omitted.

FIG. 1 is a configuration diagram of a camera system 1 according to an embodiment of the present invention. The camera system 1 includes a lens apparatus 100, an extender 200 and an image capturing apparatus 300. The lens apparatus 100 and the extender 200 are detachably attached to the image capturing apparatus 300. In this embodiment, the extender 200 has an extender optical system 201, and is attached between the lens apparatus 100 and the image capturing apparatus 300.

The lens apparatus 100 includes an image capturing optical system 101a having a focusing lens unit 101 which moves during focusing. In FIG. 1, only the focusing lens unit 101 is shown, but the lens apparatus 100 may have a zoom lens unit and other lenses. Also, the lens apparatus 100 has a lens controller 102 and a focus lens driver 103. The lens controller 102 includes a CPU and a memory 102a to store a program executed by the CPU and controls the whole operation of the lens apparatus 100. Further, the lens controller 102 controls driving of the focusing lens unit 101 through the focus lens driver 103 in accordance with a request from a camera controller 301. The lens controller 102 has a function as a first determination unit that determines a correction value (first correction value) used when the camera controller 301 corrects a detected focus detection result. Further, the lens controller 102 has a function as a second determination unit that determines a relationship, which is required for determining the correction value, between information (first information) regarding a diameter of a pupil of a focus detection optical system and information (second information) regarding a diameter of a pupil of an optical system including the image capturing optical system 101a and the extender optical system 201.

The image capturing apparatus 300 includes the camera controller 301, a phase detection AF system (focus detection unit) 302, a half mirror 303, a sub mirror 304, a pentaprism 305 and an eyepiece 306.

Object light which passed through the image capturing optical system 101a and the extender optical system 201 is split into reflected light and transmitted light by the half mirror 303. The light reflected by the half mirror 303 is guided to the eyes of the photographer through the pentaprism 305 and the eyepiece 306. Thus, the photographer can observe the object image. The light transmitted through the half mirror 303 is reflected by the sub mirror 304 and enters the phase detection AF system 302. The phase detection AF system 302 includes a focus detection optical system 302a and performs a focus detection process using incident light. The focus detection process is a process to detect an imaging position of an image formed by only the lens apparatus 100 or the lens apparatus 100 and the extender 200.

The camera controller 301 includes a CPU and a memory 301a to store a program executed by the CPU and controls the whole operation of the image capturing apparatus 300. The camera controller 301 obtains a focus correction value from the lens controller 102 and controls the driving of the focusing lens unit 101 using the obtained focus correction value. Specifically, first, a detected focus position, which is a result of the focus detection process by the phase detection AF system 302, is corrected using the focus correction value obtained from the lens controller 102, and a drive amount of the focusing lens unit 101 is calculated according to the corrected focus position. Next, the lens controller 102 controls the driving of the focusing lens unit 101 through the focus lens driver 103 on the basis of the calculated drive amount.

First Embodiment

Figure 2:
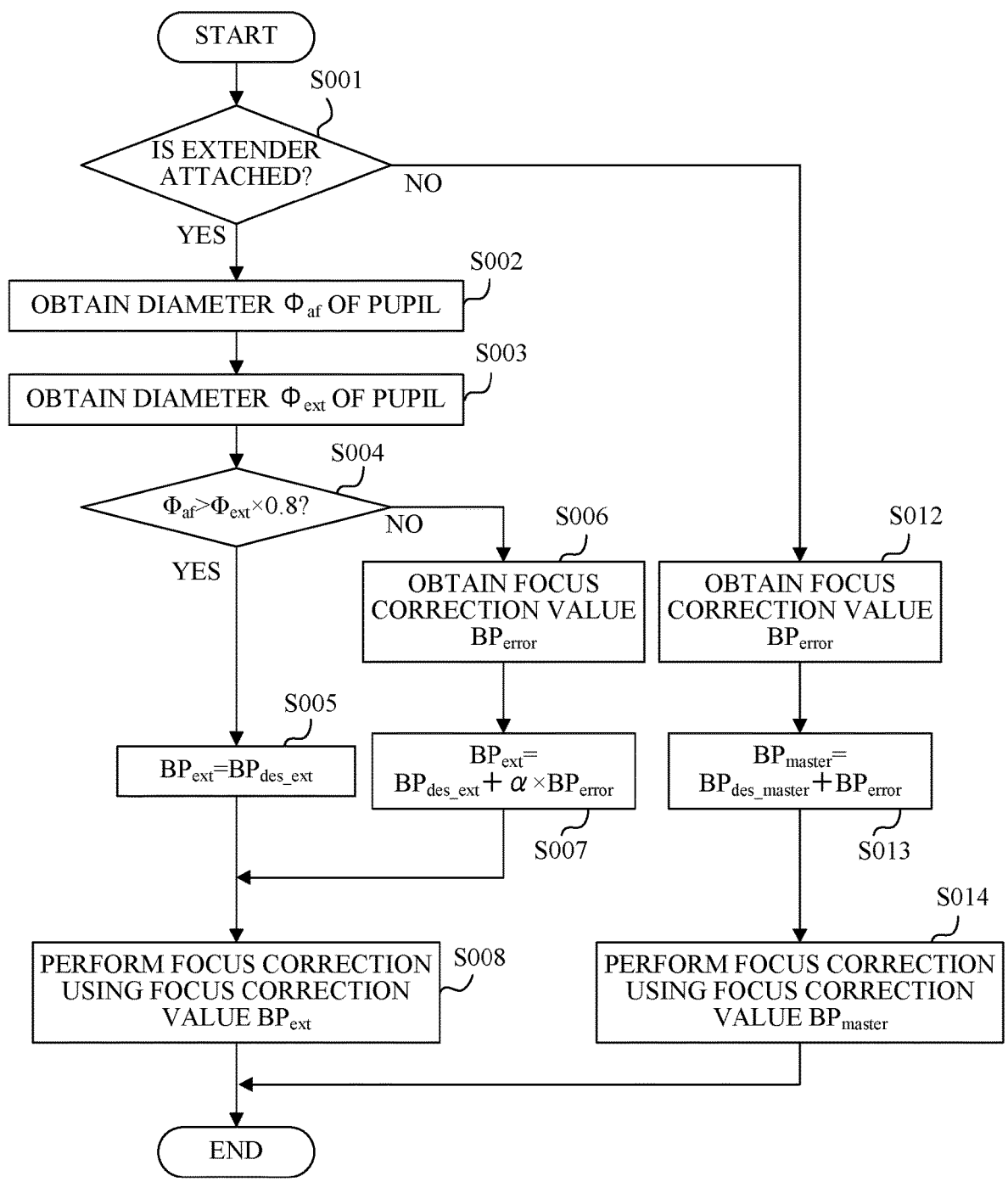
FIG. 2 is a flowchart of a correction value determination method according to a first embodiment.

Referring to FIG. 2, a description will be given of a determination method of the focus correction value when the extender 200 is attached between the lens apparatus 100 and the image capturing apparatus 300. FIG. 2 is a flowchart of a correction value determination method according to this embodiment executed by the lens controller 102.

In the step S001, the lens controller 102 determines whether or not the extender 200 is attached to the lens apparatus 100 which is attached to the image capturing apparatus 300. When the extender 200 is attached, the flow moves to the step 002, and when the extender 200 is not attached, the flow moves to the step S012.

In the step S002, the lens controller 102 obtains the diameter $\Phi_{af}$ of the pupil of the focus detection optical system 302a (the diameter of the circumcircle of the AF pupil through which the AF light flux used for the focus detection process by the phase detection AF system 302 passes) from the camera controller 301.

In the step S003, the lens controller 102 obtains the diameter $\Phi_{ext}$ of the pupil of the optical system including the image capturing optical system 101a and the extender optical system 201 (the diameter of the circumcircle of the image capturing light flux).

In the step S004, the lens controller 102 determines whether or not the diameter $\Phi_{af}$ of the pupil and the diameter $\Phi_{ext}$ of the pupil satisfy the following conditional expression (1).

$$\Phi_{af} > \Phi_{ext} \times 0.8 \quad (1)$$

When the diameter $\Phi_{af}$ of the pupil and the diameter $\Phi_{ext}$ of the pupil satisfy the conditional expression (1), i.e., when the light flux which passed through a portion where a spherical aberration is large in the focus detection process is used, the flow moves to the step S005, and the diameter $\Phi_{af}$ of the pupil and the diameter $\Phi_{ext}$ of the pupil satisfy the conditional expression (1) fail to satisfy, the flow moves to the step S006. In this embodiment, the coefficient for multiplying the diameter $\Phi_{ext}$ of the pupil is set to 0.8 in the conditional expression (1), but the present invention is not limited to this. The coefficient a is preferably 0.5 or more and 1.1 or less.

In the step S005, the lens controller 102 first obtains a focus correction value $BP_{des\_ext}$ in design when the extender 200 is attached from the memory 102a. Next, the lens controller 102 transmits the obtained focus correction value $BP_{des\_ext}$ to the camera controller 301 as a focus correction value $BP_{ext}$.

In the step S006, the lens controller 102 obtains a focus correction value $BP_{error}$ based on a manufacturing error when only the lens apparatus 100 is attached from the memory 102a.

In the step S007, the lens controller 102 calculates a focus correction value $BP_{ext}$ using the following expression (2) and transmits the calculated focus correction value $BP_{ext}$ to the camera controller 301.

$$BP_{ext} = BP_{des\_ext} + \alpha \times BP_{error} \quad (2)$$

The coefficient α may be set to the tender magnification or the square of the tender magnification. Also, in this embodiment, the value obtained by multiplying the focus correction value $BP_{error}$ by the coefficient α is added to the focus correction value $BP_{des\_ext}$ in the expression (2), but the added value ($\alpha \times BP_{error}$) may be previously stored in the memory 102a.

Figure 3A:
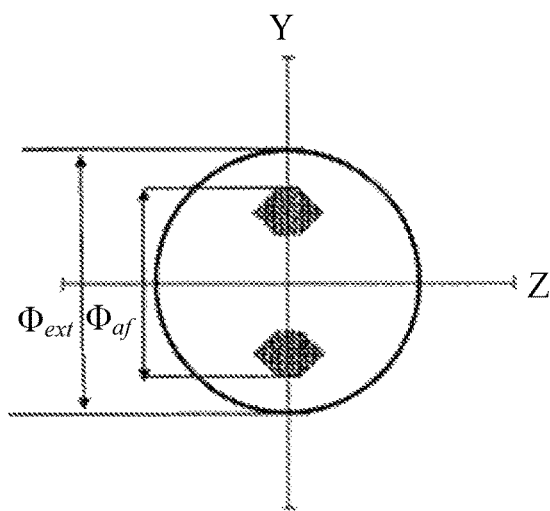
FIGS. 3A and 3B show a relationship between a diagram $\Phi_{af}$ of a pupil and a diagram $\Phi_{ext}$ of a pupil.
Figure 3B:
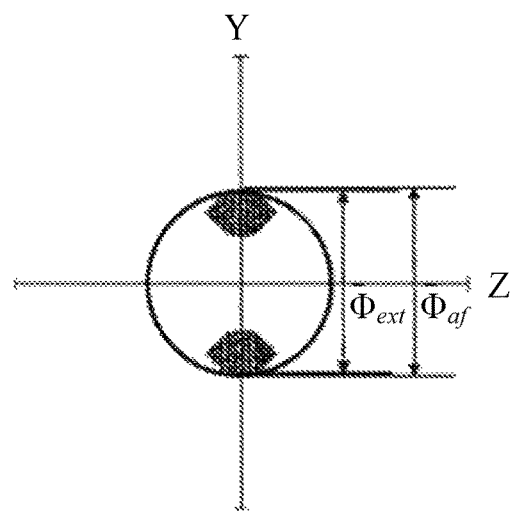

Here, a description will be given of a method of calculating the focus correction value $BP_{ext}$ when the extender 200 is attached using specific numerical values. FIGS. 3A and 3B show a relationship between the diagram $\Phi_{af}$ of the pupil and the diagram $\Phi_{ext}$ of the pupil. FIGS. 3A and 3B respectively show the relationship when the 1.4-power extender is attached and the relationship when the 2.0-power extender is attached.

In FIG. 3A, the diameter $\Phi_{af}$ of the pupil is 12.2 and the diameter $\Phi_{ext}$ of the pupil is 17.6. That is, since the diameter $\Phi_{af}$ of the pupil and the diameter $\Phi_{ext}$ of the pupil fail to satisfy the conditional expression (1), it is determined that the light flux passed through the portion where the spherical aberration is large is not used in the focus detection process. Thus, the lens controller 102 obtains the focus correction value $BP_{error}$ based on the manufacturing error and transmits the focus correction value $BP_{ext}$ calculated using the expression (2) to the camera controller 301.

In FIG. 3B, the diameter $\Phi_{af}$ of the pupil is 12.2 and the diameter $\Phi_{ext}$ of the pupil is 12. That is, since the diameter $\Phi_{af}$ of the pupil and the diameter $\Phi_{ext}$ of the pupil satisfy the conditional expression (1), it is determined that the light flux passed through the portion where the spherical aberration is large is used in the focus detection process. Thus, the lens controller 102 does not obtain the focus correction value $BP_{error}$ based on the manufacturing error and transmits the focus correction value $BP_{des\_ext}$ in design to the camera controller 301 as the focus correction value $BP_{ext}$.

In the step S008, the lens controller 102 first obtains the drive amount of the focusing lens unit 101 based on the detected focus position corrected using the focus correction value $BP_{ext}$ from the camera controller 301. Next, the lens controller 102 controls the driving of the focusing lens unit 101 through the focus lens driver 103 based on the obtained drive amount of the focusing lens unit 101.

In the step S012, the lens controller 102 obtains a previously measured focus correction value $BP_{error}$ based on a manufacturing error when only the lens apparatus 100 is attached.

In the step S013, the lens controller 102 calculates a focus correction value $BP_{master}$ when only the lens apparatus 100 is attached using the following expression (3) and transmits the calculated focus correction value $BP_{master}$ to the camera controller 301.

$$BPm_{aster} = BP_{des\_master} + BP_{error} \quad (3)$$

$BP_{des-master}$ is a focus correction value in design when only the lens apparatus 100 is attached.

In the step S014, the lens controller 102 first obtains the drive amount of the focusing lens unit 101 based on the detected focus position corrected using the focus correction value $BP_{master}$ from the camera controller 301. Next, the lens controller 102 controls the driving of the focusing lens unit 101 through the focus lens driver 103 based on the obtained drive amount of the focusing lens unit 101.

As described above, in this embodiment, the correction value corresponding to the result of the focus detection process is changed based on the information regarding the diameter of the pupil of the focus detection optical system 302a and the information regarding the diameter of the pupil of the optical system including the image capturing optical system 101a and the extender optical system 201. Thereby, defocus when the extender is attached can be reduced.

In this embodiment, the focus correction value based on the manufacturing error when only the lens apparatus 100 is attached is used in the steps S007 and S013 in FIG. 2, but the present invention is not limited to this. A value $BP_{tan}$ which is a sum of the focus correction value based on the manufacturing error and the focus correction value in design when only the lens apparatus 100 is attached may be used.

Also, in this embodiment, the flow of FIG. 2 is executed within the lens apparatus 100 but may be executed within the image capturing apparatus 300.

Second Embodiment

Figure 4:
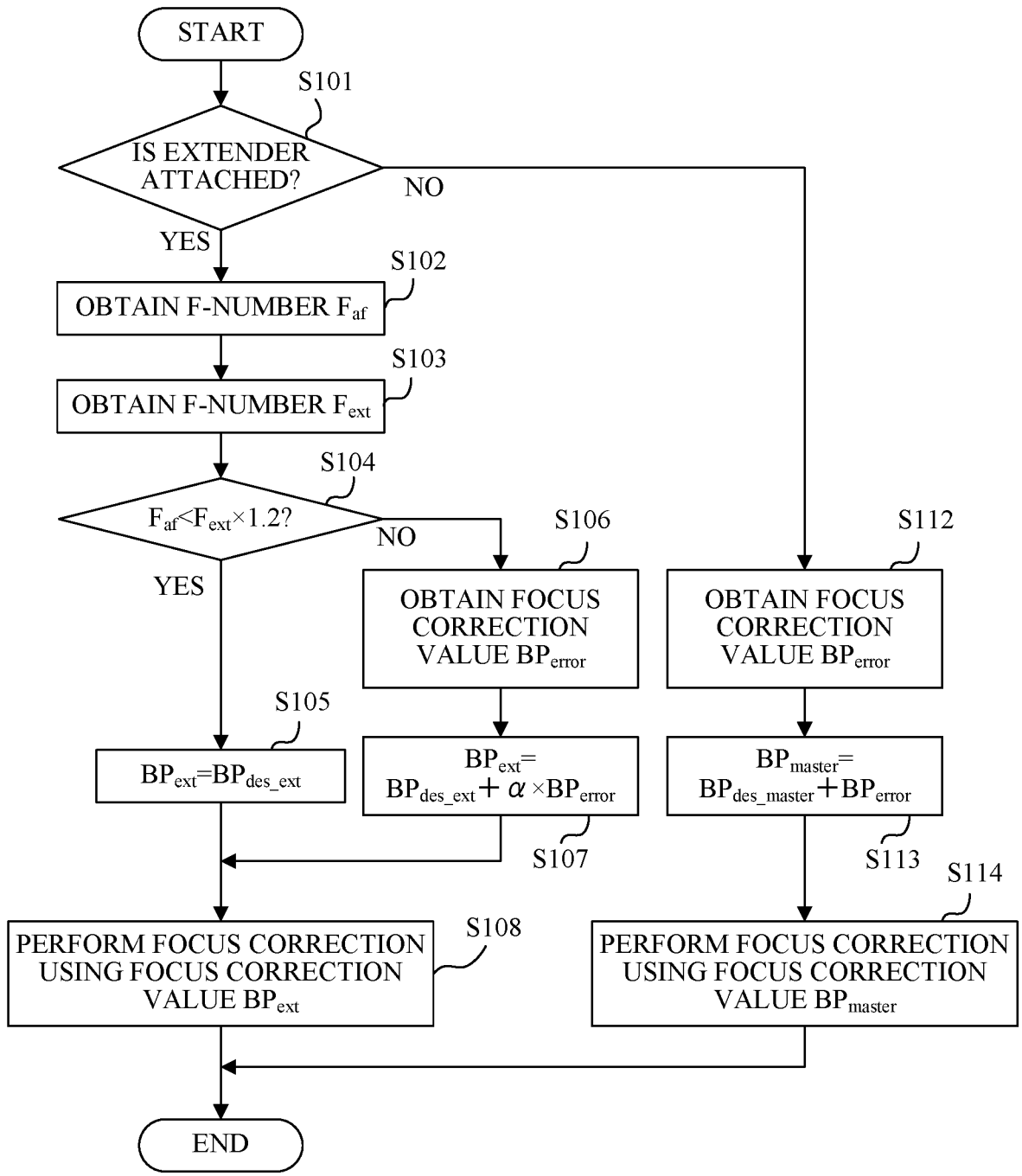
FIG. 4 is a flowchart of a correction value determination method according to a second embodiment.

Referring to FIG. 4, a description will be given of a determination method of the focus correction value when the extender 200 is attached between the lens apparatus 100 and the image capturing apparatus 300. FIG. 4 is a flowchart of a correction value determination method according to this embodiment executed by the lens controller 102.

In the step S101, the lens controller 102 determines whether or not the extender 200 is attached to the lens apparatus 100 which is attached to the image capturing apparatus 300. When the extender 200 is attached, the flow moves to the step 102, and when the extender 200 is not attached, the flow moves to the step S112.

In the step S102, the lens controller 102 obtains F-number $F_{af}$ which is information regarding the diameter of the pupil of the focus detection optical system 302a from the camera controller 301. The F-number $F_{af}$ is calculated based on the circumcircle of the AF pupil through which the AF light flux used for the focus detection process by the phase detection AF system 302 passes.

In the step S103, the lens controller 102 obtains the F-number $F_{ext}$ which is information regarding the diameter of the pupil of the optical system including the image capturing optical system 101a and the extender optical system 201. The F-number $F_{ext}$ is calculated based on the circumcircle of the image capturing light flux.

In the step S104, the lens controller 102 determines whether or not the F-number $F_{af}$ and the F-number $F_{ext}$ satisfy the following conditional expression (4).

$$F_{af} < F_{ext} \times 1.2 \quad (4)$$

When the F-number $F_{af}$ and the F-number $F_{ext}$ satisfy the conditional expression (4), i.e., when the light flux which passed through a portion where a spherical aberration is large in the focus detection process is used, the flow moves to the step S105, and the F-number $F_{af}$ and the F-number $F_{ext}$ satisfy the conditional expression (4) fail to satisfy, the flow moves to the step S106. In this embodiment, the coefficient for multiplying the F-number $F_{ext}$ is set to 1.2 in the conditional expression (4), but the present invention is not limited to this. The coefficient a is preferably 0.9 or more and 2.0 or less.

In the step S105, the lens controller 102 first obtains a focus correction value $BP_{des\_ext}$ in design when the extender 200 is attached from the memory 102a. Next, the lens controller 102 transmits the obtained focus correction value $BP_{des\_ext}$ to the camera controller 301 as a focus correction value $BP_{ext}$.

In the step S106, the lens controller 102 obtains a focus correction value $BP_{error}$ based on a manufacturing error when only the lens apparatus 100 is attached from the memory 102a.

In the step S107, the lens controller 102 calculates a focus correction value $BP_{ext}$ using the above-mentioned expression (2) and transmits the calculated focus correction value $BP_{ext}$ to the camera controller 301.

Figure 5A:
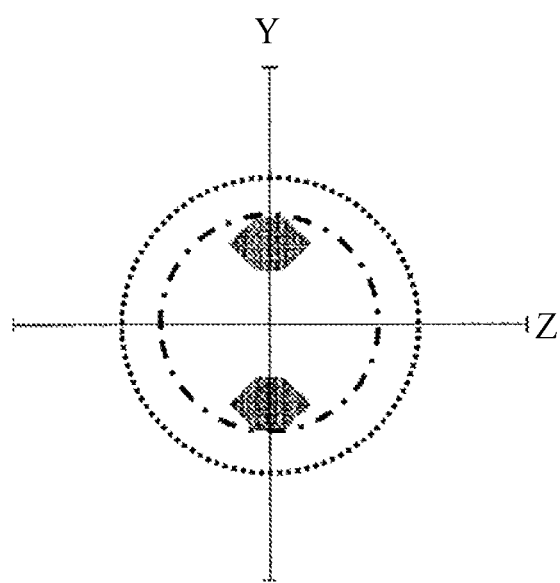
FIGS. 5A and 5B show a relationship between a F-number $F_{af}$ and a F-number $F_{ext}$.
Figure 5B:
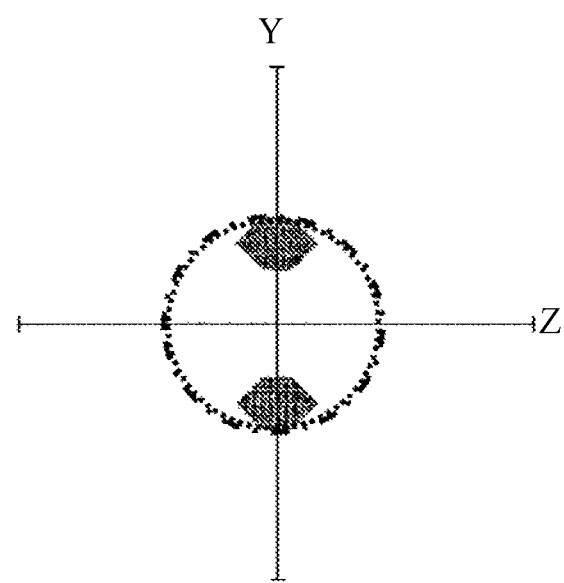

Here, a description will be given of a method of calculating the focus correction value $BP_{ext}$ using specific numerical values. FIGS. 5A and 5B show a relationship between the F-number $F_{af}$ and the F-number $F_{ext}$. In FIGS. 5A and 5B, the circumcircle of the AF pupil is indicated by a one-dot broken line, and the circumcircle of the image capturing light flux is indicated by a broken line. FIGS. 5A and 5B respectively show the relationship when the 1.4-power extender is attached and the relationship when the 2.0-power extender is attached.

In FIG. 5A, the F-number $F_{af}$ is 8 and the F-number $F_{ext}$ is 5.6. That is, since the F-number $F_{af}$ and the F-number $F_{ext}$ fail to satisfy the conditional expression (4), it is determined that the light flux passed through the portion where the spherical aberration is large is not used in the focus detection process. Thus, the lens controller 102 obtains the focus correction value $BP_{error}$ based on the manufacturing error and transmits the focus correction value $BP_{ext}$ calculated using the expression (2) to the camera controller 301.

In FIG. 5B, the F-number $F_{af}$ is 8 and the F-number $F_{ext}$ is 8. That is, since the F-number $F_{af}$ and the F-number $F_{ext}$ satisfy the conditional expression (4), it is determined that the light flux passed through the portion where the spherical aberration is large is used in the focus detection process. Thus, the lens controller 102 does not obtain the focus correction value $BP_{error}$ based on the manufacturing error and transmits the focus correction value $BP_{des\_ext}$ in design to the camera controller 301 as the focus correction value $BP_{ext}$.

In the step S108, the lens controller 102 first obtains the drive amount of the focusing lens unit 101 based on the detected focus position corrected using the focus correction value $BP_{ext}$ from the camera controller 301. Next, the lens controller 102 controls the driving of the focusing lens unit 101 through the focus lens driver 103 based on the obtained drive amount of the focusing lens unit 101.

In the step S112, the lens controller 102 obtains a previously measured focus correction value $BP_{error}$ based on a manufacturing error when only the lens apparatus 100 is attached.

In the step S113, the lens controller 102 calculates a focus correction value $BP_{master}$ when only the lens apparatus 100 is attached using the above-mentioned expression (3) and transmits the calculated focus correction value $BP_{master}$ to the camera controller 301.

In the step S114, the lens controller 102 first obtains the drive amount of the focusing lens unit 101 based on the detected focus position corrected using the focus correction value $BP_{master}$ from the camera controller 301. Next, the lens controller 102 controls the driving of the focusing lens unit 101 through the focus lens driver 103 based on the obtained drive amount of the focusing lens unit 101.

As described above, in this embodiment, the correction value corresponding to the result of the focus detection process is changed based on the information regarding the diameter of the pupil of the focus detection optical system 302a and the information regarding the diameter of the pupil of the optical system including the image capturing optical system 101a and the extender optical system 201. Thereby, defocus when the extender is attached can be reduced.

In this embodiment, the focus correction value based on the manufacturing error when only the lens apparatus 100 is attached is used in the steps S107 and S113 in FIG. 4, but the present invention is not limited to this. A value $BP_{tan}$ which is a sum of the focus correction value based on the manufacturing error and the focus correction value in design when only the lens apparatus 100 is attached may be used.

Also, in this embodiment, the flow of FIG. 4 is executed within the lens apparatus 100 but may be executed within the image capturing apparatus 300.

Third Embodiment

Figure 6:
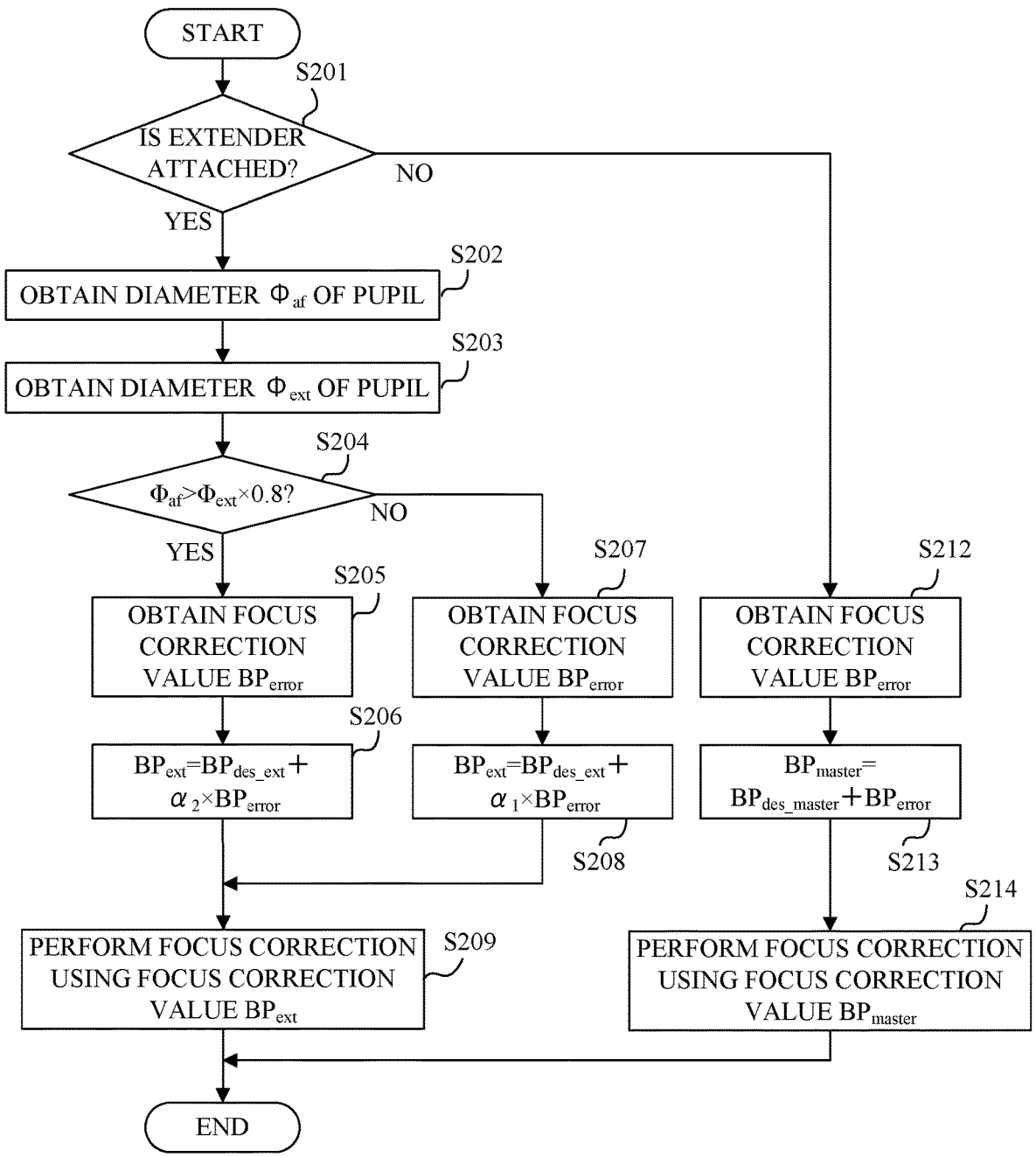
FIG. 6 is a flowchart of a correction value determination method according to a third embodiment.

Referring to FIG. 6, a description will be given of a determination method of the focus correction value when the extender 200 is attached between the lens apparatus 100 and the image capturing apparatus 300. FIG. 6 is a flowchart of a correction value determination method according to this embodiment executed by the lens controller 102.

Processes from the step S201 to the step S204 are respectively the same as the processes from the step S001 to the step S004 in FIG. 2 and thus a detailed description thereof will be omitted.

In the step S205, the lens controller 102 obtains a focus correction value $BP_{error}$ based on a manufacturing error when only the lens apparatus 100 is attached from the memory 102a.

In the step S206, the lens controller 102 calculates a focus correction value BPext using the following expression (5) and transmits the calculated focus correction value $BP_{ext}$ to the camera controller 301.

$$BP_{ext}=BP_{des\_ext}+\alpha 2 \times BP{error} \quad (5)$$

The coefficient α2 is set to be larger than 0 and smaller than a coefficient α1 described later. Also, in this embodiment, the value obtained by multiplying the focus correction value $BP_{error}$ by the coefficient α2 is added to the focus correction value $BP_{des\_ext}$ in the expression (5), but the added value ($\alpha 2 \times BP_{error}$) may be previously stored in the memory 102a.

In the step S207, the lens controller 102 obtains a previously measured focus correction value $BP_{error}$ based on a manufacturing error when only the lens apparatus 100 is attached.

In the step S208, the lens controller 102 calculates a focus correction value $BP_{ext}$ using the following expression (6) and transmits the calculated focus correction value $BP_{ext}$ to the camera controller 301.

$$BP_{ext}=BP_{des\_ext}+\alpha 1 \times BP_{error} \quad (6)$$

In this embodiment, the value obtained by multiplying the focus correction value $BP_{error}$ by the coefficient α1 is added to the focus correction value $BP_{des\_ext}$ in the expression (6), but the added value ($\alpha 1 \times BP_{error}$) may be previously stored in the memory 102a.

Here, a description will be given of a method of calculating the focus correction value $BP_{ext}$ when the extender 200 is attached using FIGS. 3A and 3B described in the first embodiment.

In FIG. 3A, the diameter $\Phi_{af}$ of the pupil is 12.2 and the diameter $\Phi_{ext}$ of the pupil is 17.6. That is, since the diameter $\Phi_{af}$ of the pupil and the diameter $\Phi_{ext}$ of the pupil fail to satisfy the conditional expression (1), it is determined that the light flux passed through the portion where the spherical aberration is large is not used in the focus detection process. Thus, the lens controller 102 transmits the focus correction value $BP_{ext}$ calculated using the expression (6) to the camera controller 301.

In FIG. 3B, the diameter $\Phi_{af}$ of the pupil is 12.2 and the diameter $\Phi_{ext}$ of the pupil is 12. That is, since the diameter $\Phi_{af}$ of the pupil and the diameter $\Phi_{ext}$ of the pupil satisfy the conditional expression (1), it is determined that the light flux passed through the portion where the spherical aberration is large is used in the focus detection process. Thus, the lens controller 102 transmits the focus correction value $BP_{ext}$ calculated using the expression (5) to the camera controller 301.

A process S209 and processes from the step S212 to the step S214 are respectively the same as the process S008 and the processes from the step S012 to the step S014 in FIG. 2 and thus a detailed description thereof will be omitted.

As described above, in this embodiment, the correction value corresponding to the result of the focus detection process is changed based on the information regarding the diameter of the pupil of the focus detection optical system 302a and the information regarding the diameter of the pupil of the optical system including the image capturing optical system 101a and the extender optical system 201. Thereby, defocus when the extender is attached can be reduced.

In this embodiment, two coefficients to be multiplied by the focus correction value $BP_{error}$ based on the manufacturing error are used, but the present invention is not limited to this. When the number of branches in the step S204 is increased, a coefficient corresponding thereto may be set. One of the plurality of coefficients to be set may be zero.

Further, in this embodiment, the focus correction value based on the manufacturing error when only the lens apparatus 100 is attached is used in the steps S206, S208 and S213 in FIG. 6, but the present invention is not limited to this. A value $BP_{tan}$ which is a sum of the focus correction value based on the manufacturing error and the focus correction value in design when only the lens apparatus 100 is attached may be used.

Also, in this embodiment, the flow of FIG. 6 is executed within the lens apparatus 100 but may be executed within the image capturing apparatus 300.

Fourth Embodiment

Figure 7:
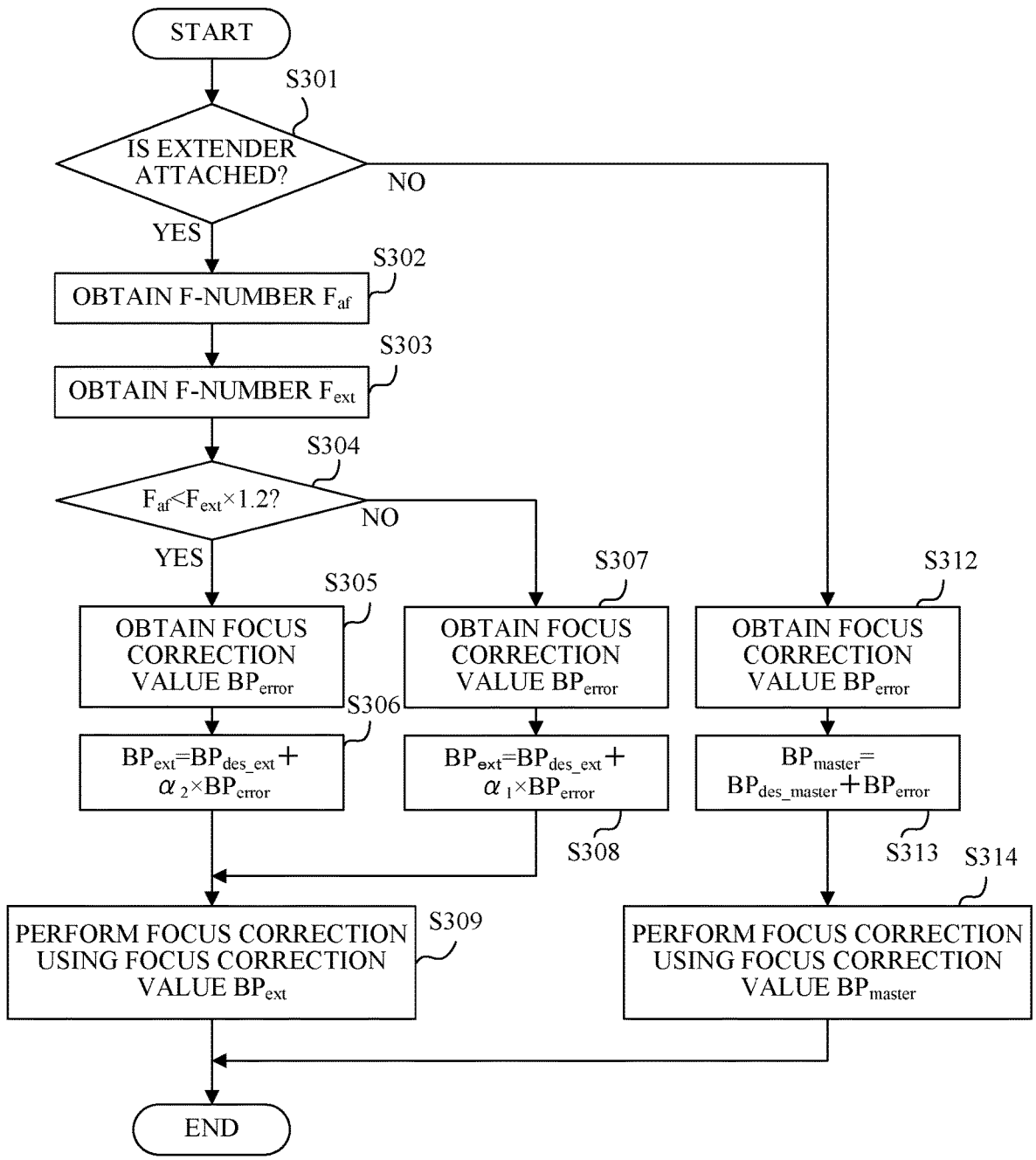
FIG. 7 is a flowchart of a correction value determination method according to a fourth embodiment.

Referring to FIG. 7, a description will be given of a determination method of the focus correction value when the extender 200 is attached between the lens apparatus 100 and the image capturing apparatus 300. FIG. 7 is a flowchart of a correction value determination method according to this embodiment executed by the lens controller 102.

Processes from the step S301 to the step S304 are respectively the same as the processes from the step S101 to the step S104 in FIG. 4 and thus a detailed description thereof will be omitted.

In the step S305, the lens controller 102 obtains a focus correction value $BP_{error}$ based on a manufacturing error when only the lens apparatus 100 is attached from the memory 102a.

In the step S306, the lens controller 102 calculates a focus correction value $BP_{ext}$ using the following expression (7) and transmits the calculated focus correction value $BP_{ext}$ to the camera controller 301.

$$BP_{ext}=BP_{des\_ext}+\alpha 2\times BP_{error} \quad (7)$$

The coefficient $\alpha 2$ is set to be larger than 0 and smaller than a coefficient $\alpha 1$ described later. Also, in this embodiment, the value obtained by multiplying the focus correction value $BP_{error}$ by the coefficient $\alpha 2$ is added to the focus correction value $BP_{des\_ext}$ in the expression (7), but the added value ($\alpha 2\times BP_{error}$) may be previously stored in the memory 102a.

In the step S307, the lens controller 102 obtains a focus correction value $BP_{error}$ based on a manufacturing error when only the lens apparatus 100 is attached from the memory 102a.

In the step S308, the lens controller 102 calculates a focus correction value $BP_{ext}$ using the following expression (8) and transmits the calculated focus correction value $BP_{ext}$ to the camera controller 301.

$$BP_{ext}=BP_{des\_ext}+\alpha 1\times BP_{error} \quad (8)$$

In this embodiment, the value obtained by multiplying the focus correction value $BP_{error}$ by the coefficient $\alpha 1$ is added to the focus correction value $BP_{des\_ext}$ in the expression (8), but the added value ($\alpha 1\times BP_{error}$) may be previously stored in the memory 102a.

Here, a description will be given of a method of calculating the focus correction value $BP_{ext}$ when the extender 200 is attached using FIGS. 5A and 5B described in the second embodiment.

In FIG. 5A, the F-numbers $F_{af}$ and $F_{ext}$ are respectively 8 and 5.6, and fail to satisfy the conditional expression (4), and thus it is determined that the light flux passed through the portion where the spherical aberration is large is not used in the focus detection process. Accordingly, the lens controller 102 transmits the focus correction value $BP_{ext}$ calculated using the expression (8) to the camera controller 301.

In FIG. 5B, the F-numbers $F_{af}$ and $F_{ext}$ are respectively 8 and 8, and satisfy the conditional expression (4), and thus it is determined that the light flux passed through the portion where the spherical aberration is large is used in the focus detection process. Accordingly, the lens controller 102 transmits the focus correction value $BP_{ext}$ calculated using the expression (7) to the camera controller 301.

A process S309 and processes from the step S312 to the step S314 are respectively the same as the process S108 and the processes from the step S112 to the step S114 of FIG. 2 and thus a detailed description thereof will be omitted.

As described above, in this embodiment, the correction value corresponding to the result of the focus detection process is changed based on the information regarding the diameter of the pupil of the focus detection optical system 302a and the information regarding the diameter of the pupil of the optical system including the image capturing optical system 101a and the extender optical system 201. Thereby, defocus when the extender is attached can be reduced.

In this embodiment, two coefficients to be multiplied by the focus correction value $BP_{error}$ based on the manufacturing error are used, but the present invention is not limited to this. When the number of branches in the step S204 is increased, a coefficient corresponding thereto may be set. One of the plurality of coefficients to be set may be zero.

Further, in this embodiment, the focus correction value based on the manufacturing error when only the lens apparatus 100 is attached is used in the steps S306, S308 and S313 in FIG. 7, but the present invention is not limited to this. A value $BP_{tan}$ which is a sum of the focus correction value based on the manufacturing error and the focus correction value in design when only the lens apparatus 100 is attached may be used.

Also, in this embodiment, the flow of FIG. 7 is executed within the lens apparatus 100 but may be executed within the image capturing apparatus 300.

Fifth Embodiment

Figure 8:
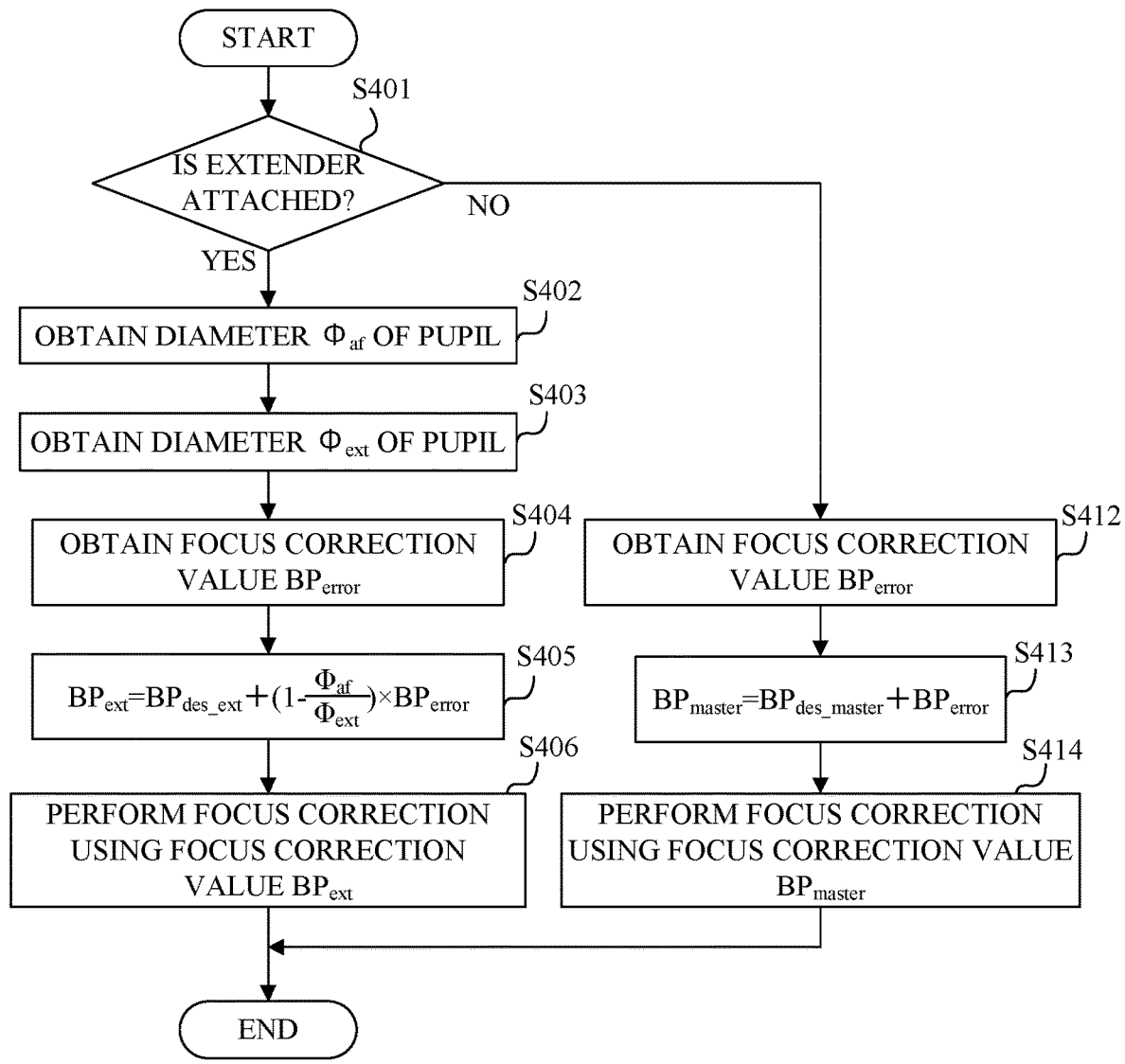
FIG. 8 is a flowchart of a correction value determination method according to a fifth embodiment.

Referring to FIG. 8, a description will be given of a determination method of the focus correction value when the extender 200 is attached between the lens apparatus 100 and the image capturing apparatus 300. FIG. 8 is a flowchart of a correction value determination method according to this embodiment executed by the lens controller 102.

Processes from the step S401 to the step S403 are respectively the same as the processes from the step S001 to the step S003 in FIG. 2 and thus a detailed description thereof will be omitted.

In the step S404, the lens controller 102 obtains a focus correction value $BP_{error}$ based on a manufacturing error when only the lens apparatus 100 is attached from the memory 102a.

In the step S405, the lens controller 102 calculates a focus correction value $BP_{ext}$ using the following expression (9) and transmits the calculated focus correction value $BP_{ext}$ to the camera controller 301.

$$BP_{ext}=BP_{des\_ext}+(1-\Phi_{af}/\Phi_{ext})\times BP_{error} \quad (9)$$

Here, a description will be given of a method of calculating the focus correction value $BP_{ext}$ when the extender 200 is attached using FIGS. 3A and 3B described in the first embodiment.

In FIG. 3A, the diameter $\Phi_{af}$ of the pupil is 12.2 and the diameter $\Phi_{ext}$ of the pupil is 17.6. The lens controller 102 obtains the focus correction value $BP_{error}$ based on the manufacturing error and transmits the focus correction value $BP_{ext}$ calculated using the expression (9) to the camera controller 301.

In FIG. 3B, the diameter $\Phi_{af}$ of the pupil is 12.2 and the diameter $\Phi_{ext}$ of the pupil is 12. The lens controller 102 obtains the focus correction value $BP_{error}$ based on the manufacturing error and transmits the focus correction value $BP_{ext}$ calculated using the expression (9) to the camera controller 301.

A process S406 and processes from the step S412 to the step S414 are respectively the same as the process S008 and the processes from the step S012 to the step S014 in FIG. 2 and thus a detailed description thereof will be omitted.

As described above, in this embodiment, the correction value corresponding to the result of the focus detection process is changed based on the information regarding the diameter of the pupil of the focus detection optical system 302a and the information regarding the diameter of the pupil of the optical system including the image capturing optical system 101a and the extender optical system 201. Thereby, defocus when the extender is attached can be reduced.

In this embodiment, the focus correction value based on the manufacturing error when only the lens apparatus 100 is attached is used in the step S405 in FIG. 8, but the present invention is not limited to this. A value $BP_{tan}$ which is a sum of the focus correction value based on the manufacturing error and the focus correction value in design when only the lens apparatus 100 is attached may be used.

Also, in this embodiment, the flow of FIG. 8 is executed within the lens apparatus 100 but may be executed within the image capturing apparatus 300.

Sixth Embodiment

Figure 9:
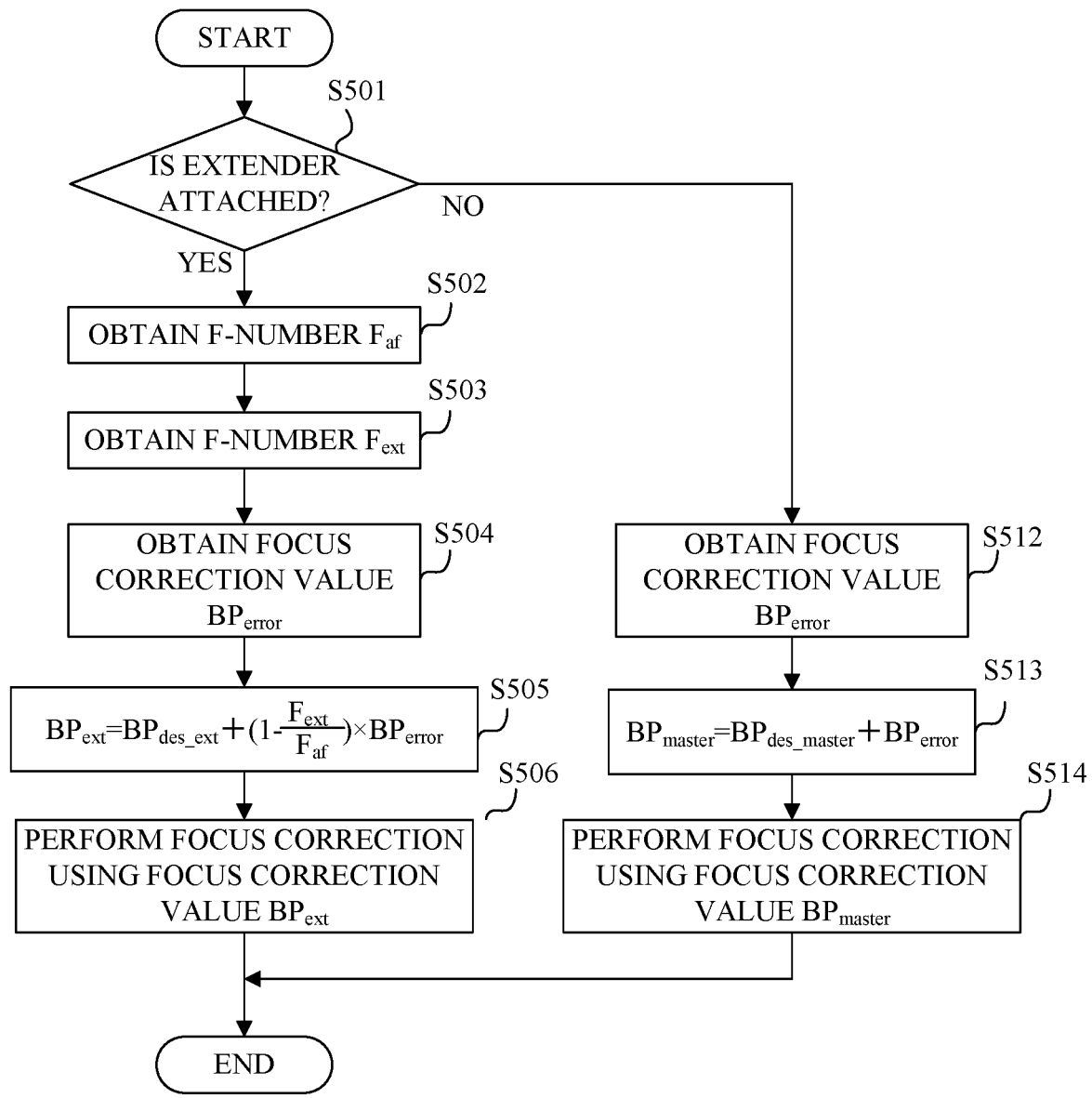
FIG. 9 is a flowchart of a correction value determination method according to a sixth embodiment.
Figure 10A:
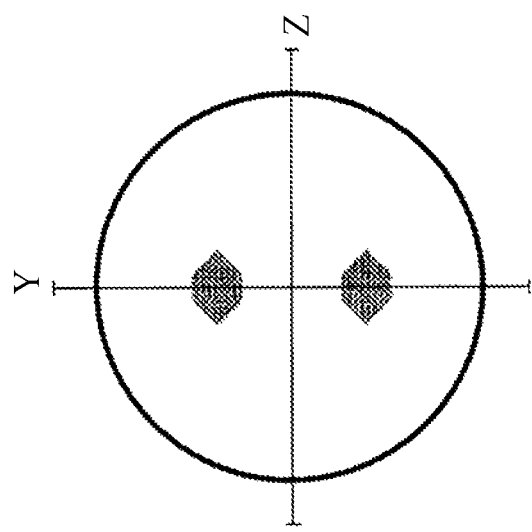
FIGS. 10A to 10C show a relationship between an AF pupil and an image capturing light flux.
Figure 10B:
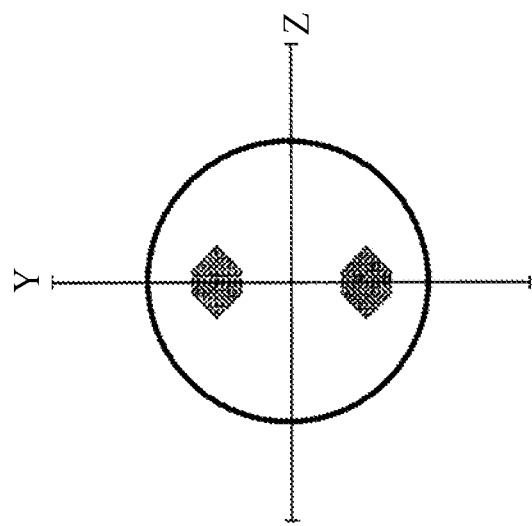
Figure 10C:
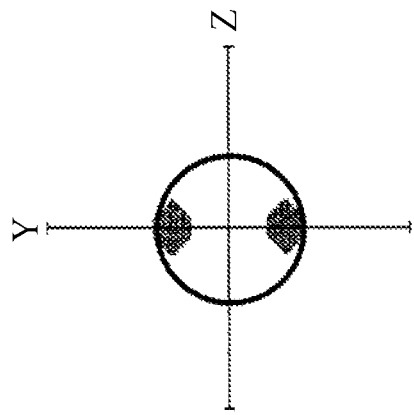
Figures 11A, 11B, 11C, 12:
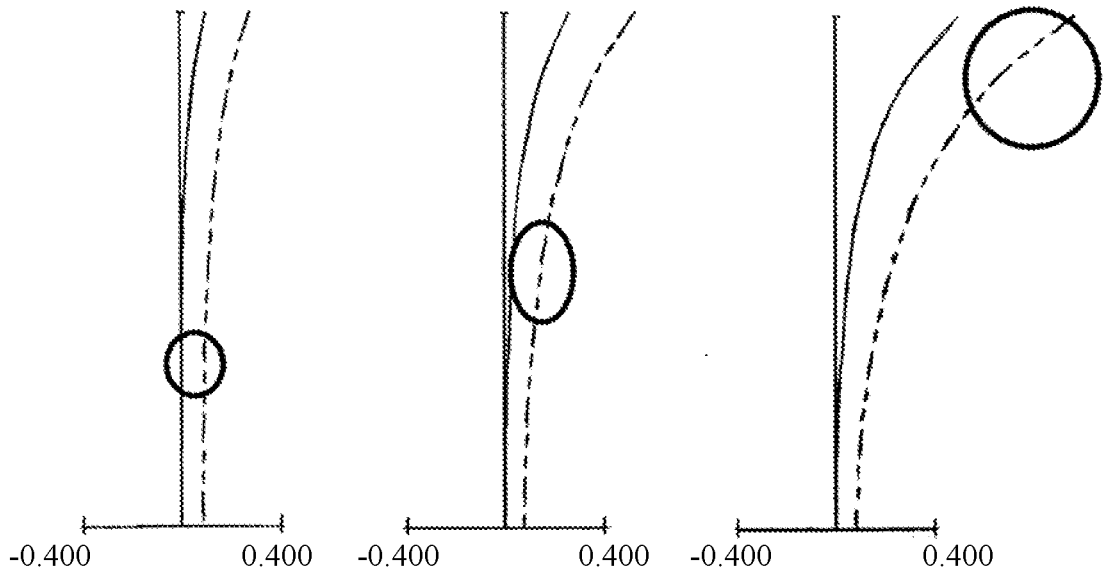
FIGS. 11A to 11C show a spherical aberration.
FIG. 12 is a table showing a change of a focus correction value.

Referring to FIG. 9, a description will be given of a determination method of the focus correction value when the extender 200 is attached between the lens apparatus 100 and the image capturing apparatus 300. FIG. 9 is a flowchart of a correction value determination method according to this embodiment executed by the lens controller 102.

Processes from the step S501 to the step S503 are respectively the same as the processes from the step S101 to the step S103 in FIG. 4 and thus a detailed description thereof will be omitted.

In the step S504, the lens controller 102 obtains a focus correction value $BP_{error}$ based on a manufacturing error when only the lens apparatus 100 is attached from the memory 102a.

In the step S505, the lens controller 102 calculates a focus correction value $BP_{ext}$ using the following expression (10) and transmits the calculated focus correction value $BP_{ext}$ to the camera controller 301.

$$BP_{ext} = BP_{des\_ext} + (1 - F_{ext}/F_{af}) \times BP_{error} \quad (10)$$

Here, a description will be given of a method of calculating the focus correction value $BP_{ext}$ when the extender 200 is attached using FIGS. 5A and 5B described in the second embodiment.

In FIG. 5A, the F-number $F_{af}$ is 8 and the F-number $F_{ext}$ is 5.6. The lens controller 102 obtains the focus correction value $BP_{error}$ based on the manufacturing error and transmits the focus correction value $BP_{ext}$ calculated using the expression (10) to the camera controller 301.

In FIG. 5B, the F-number $F_{af}$ is 8 and the F-number $F_{ext}$ is 8. The lens controller 102 obtains the focus correction value $BP_{error}$ based on the manufacturing error and transmits the focus correction value $BP_{ext}$ calculated using the expression (10) to the camera controller 301.

A process S506 and processes from the step S512 to the step S514 are respectively the same as the process S108 and the processes from the step S112 to the step S114 in FIG. 4 and thus a detailed description thereof will be omitted.

As described above, in this embodiment, the correction value corresponding to the result of the focus detection process is changed based on the information regarding the diameter of the pupil of the focus detection optical system 302a and the information regarding the diameter of the pupil of the optical system including the image capturing optical system 101a and the extender optical system 201. Thereby, defocus when the extender is attached can be reduced.

In this embodiment, the focus correction value based on the manufacturing error when only the lens apparatus 100 is attached is used in the step S505 in FIG. 9, but the present invention is not limited to this. A value $BP_{tan}$ which is a sum of the focus correction value based on the manufacturing error and the focus correction value in design when only the lens apparatus 100 is attached may be used.

Also, in this embodiment, the flow of FIG. 9 is executed within the lens apparatus 100 but may be executed within the image capturing apparatus 300.

The method in which the lens controller 102 determines the first correction value using the expressions described in each embodiment has been described, the method of determining the first correction value is not limited to this. For example, a table associating a value a determined from the diameter $\Phi_{af}$ of the pupil and the diameter $\Phi_{ext}$ of the pupil with the corresponding first correction value is stored, and the lens controller 102 may refer to the table to determine the first correction value.

The process described in each embodiment may be executed within the image capturing apparatus 300, but in that case, the controller 301 has the function as the second determination unit that determines the relationship between the information regarding the diameter of the pupil of the focus detection optical system 302a and the information regarding the diameter of the pupil of the optical system including the image capturing optical system 101a and the extender optical system 201. The controller 301 also has the function as the determination unit to determinate the first correction value. Further, the image capturing apparatus 300 obtains the second correction value or the second correction value and the third correction value from the attached lens apparatus 100 to calculate the first correction value. The information regarding the diameter of the pupil of the optical system including the image capturing optical system 101a and the extender optical system 201 may be calculated by the lens apparatus 100 or may be calculated based on the information of the optical system obtained from each of the lens apparatus 100 and the extender 200 by the controller 301.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-070516, filed on Apr. 2, 2018, which is hereby incorporated by reference herein in its entirety.

What is claimed is:

1. A lens apparatus detachably attachable to an image capturing apparatus, which includes a focus detection circuit having a focus detection optical system and configured to perform a focus detection process by a phase detection, and a controller configured to control driving of a focusing lens unit based on a result of the focus detection process by the focus detection circuit, via an extender including an extender optical system, the lens apparatus comprising:

an image capturing optical system including the focusing lens unit; and a first determination circuit configured to determine a first correction value used when the controller corrects the result of the focus detection process, wherein when the lens apparatus is attached to the image capturing apparatus via the extender, the first determination circuit determines the first correction value based on first information regarding a diameter of a pupil of the focus detection optical system and second information regarding a diameter of a pupil of an optical system including the image capturing optical system and the extender optical system.

2. The lens apparatus according to claim 1, further comprising a memory configured to store a second correction value used when the controller corrects the result of the focus detection process where the lens apparatus is attached to the image capturing apparatus directly, wherein the first determination circuit determines the first correction value based on the second correction value.

3. The lens apparatus according to claim 1, further comprising a second determination circuit configured to determine a relationship between the diameter of the pupil of the focus detection optical system and the diameter of the pupil of the optical system including the image capturing optical system and the extender optical system, wherein the first information is the diameter of the pupil of the focus detection optical system, wherein the second information is the diameter of the pupil of the optical system including the image capturing optical system and the extender optical system, and wherein the first determination circuit determines the first correction value based on a determination result by the second determination circuit.

4. The lens apparatus according to claim 3, further comprising a memory configured to store a second correction value used when the controller corrects the result of the focus detection process where the lens apparatus is attached to the image capturing apparatus directly, and a third correction value in design used when the controller corrects the result of the focus detection process where the lens apparatus is attached to the image capturing apparatus via the extender, and wherein where $\Phi_{af}$ represents the diameter of the pupil of the focus detection optical system, $\Phi_{ext}$ represents the diameter of the pupil of the optical system including the image capturing optical system and the extender optical system, $BP_{ext}$ represents the first correction value, $BP_{tan}$ represents the second correction value, b represents the third correction value, and $\alpha$ represents a coefficient, in a case where the second determination circuit determines that a conditional expression of $\Phi_{af} < \Phi_{ext} \times a$ ($0.5 \leq a \leq 1.1$) is satisfied, the first determination circuit calculates the first correction value using an expression of $BP_{ext} = b + \alpha \times BP_{tan}$ ($0 < \alpha$), and in a case where the second determination circuit determines that a conditional expression of $\Phi_{af} > \Phi_{ext} \times a$ is satisfied, the first determination circuit calculates the first correction value using an expression of $BP_{ext} = b$.

5. The lens apparatus according to claim 3, further comprising a memory configured to store a second correction value used when the controller corrects the result of the focus detection process where the lens apparatus is attached to the image capturing apparatus directly, and a third correction value in design used when the controller corrects the result of the focus detection process where the lens apparatus is attached to the image capturing apparatus via the extender, and wherein where $\Phi_{af}$ represents the diameter of the pupil of the focus detection optical system, $\Phi_{ext}$ represents the diameter of the pupil of the optical system including the image capturing optical system and the extender optical system, $BP_{ext}$ represents the first correction value, $BP_{tan}$ represents the second correction value, b represents the third correction value, and $\alpha_1$, $\alpha_2$ ($0 < \alpha_2 < \alpha_1$) represent coefficients, in a case where the second determination circuit determines that a conditional expression of $\Phi_{af} < \Phi_{ext} \times a$ ($0.5 \leq a \leq 1.1$) is satisfied, the first determination circuit calculates the first correction value using an expression of $BP_{ext} = b + \alpha_1 \times BP_{tan}$, and in a case where the second determination circuit determines that a conditional expression of $\Phi_{af} > \Phi_{ext} \times a$ is satisfied, the first determination circuit calculates the first correction value using an expression of $BP_{ext} = b + \alpha_2 \times BP_{tan}$.

6. The lens apparatus according to claim 2, wherein the memory stores a third correction value in design used when the controller corrects the result of the focus detection process where the lens apparatus is attached to the image capturing apparatus via the extender, and wherein when $\Phi_{af}$ represents the diameter of the pupil of the focus detection optical system, $\Phi_{ext}$ represents the diameter of the pupil of the optical system including the image capturing optical system and the extender optical system, $BP_{ext}$ represents the first correction value, $BP_{tan}$ represents the second correction value, b represents the third correction value, the first determination circuit calculates the first correction value using an expression of $BP_{ext} = b + (1 - \Phi_{af}/\Phi_{ext}) \times BP_{tan}$.

7. The lens apparatus according to claim 1, further comprising a second determination circuit configured to determine a relationship between an F-number corresponding to the diameter of the pupil of the focus detection optical system and an F-number corresponding to the diameter of the pupil of the optical system including the image capturing optical system and the extender optical system, wherein the first information is the F-number corresponding to the diameter of the pupil of the focus detection optical system, wherein the second information is the F-number corresponding to the diameter of the pupil of the optical system including the image capturing optical system and the extender optical system, and wherein the first determination circuit determines the first correction value based on a determination result by the second determination circuit.

8. The lens apparatus according to claim 7, further comprising a memory configured to store a second correction value used when the controller corrects the result of the focus detection process where the lens apparatus is attached to the image capturing apparatus directly, and a third correction value in design used when the controller corrects the result of the focus detection process where the lens apparatus is attached to the image capturing apparatus via the extender, wherein where $F_{af}$ represents the F-number corresponding to the diameter of the pupil of the focus detection optical system, $F_{ext}$ represents the F-number corresponding to the diameter of the pupil of the optical system including the image capturing optical system and the extender optical system, $BP_{ext}$ represents the first correction value, $BP_{tan}$ represents the second correction value, b represents the third correction value, and α represents a coefficient, in a case where the second determination circuit determines that a conditional expression of $F_{af} > F_{ext} \times a$ (0.9≤a≤2.0) is satisfied, the first determination circuit calculates the first correction value using an expression of $BP_{ext} = b + \alpha \times BP_{tan}$ (0<α), and in a case where the second determination circuit determines that a conditional expression of $F_{af} < F_{ext} \times a$ is satisfied, the first determination circuit calculates the first correction value using an expression of $BP_{ext} = b$.

9. The lens apparatus according to claim 7, further comprising a memory configured to store a second correction value used when the controller corrects the result of the focus detection process where the lens apparatus is attached to the image capturing apparatus directly, and a third correction value in design used when the controller corrects the result of the focus detection process where the lens apparatus is attached to the image capturing apparatus via the extender, wherein where $F_{af}$ represents the F-number corresponding to the diameter of the pupil of the focus detection optical system, $F_{ext}$ represents the F-number corresponding to the diameter of the pupil of the optical system including the image capturing optical system and the extender optical system, $BP_{ext}$ represents the first correction value, $BP_{tan}$ represents the second correction value, b represents the third correction value, and $\alpha_1$, $\alpha_2$ ($0<\alpha_2<\alpha_1$) represent coefficients, in a case where the second determination circuit determines that a conditional expression of $F_{af} > F_{ext} \times a$ (0.9≤a≤2.0) is satisfied, the first determination circuit calculates the first correction value using an expression of $BP_{ext} = b + \alpha_1 \times BP_{tan}$, and in a case where the second determination circuit determines that a conditional expression of $F_{af} < F_{ext} \times a$ is satisfied, the first determination circuit calculates the first correction value using an expression of $BP_{ext} = b + \alpha_2 \times BP_{tan}$.

10. The lens apparatus according to claim 2, wherein the memory stores a third correction value in design used when the controller corrects the result of the focus detection process where the lens apparatus is attached to the image capturing apparatus via the extender, and wherein when $F_{af}$ represents an F-number corresponding to the diameter of the pupil of the focus detection optical system, $F_{ext}$ represents an F-number corresponding to the diameter of the pupil of the optical system including the image capturing optical system and the extender optical system, $BP_{ext}$ represents the first correction value, $BP_{tan}$ represents the second correction value, b represents the third correction value, the first determination circuit calculates the first correction value using an expression of $BP_{ext} = b + (1 - F_{ext}/F_{af}) \times BP_{tan}$.

11. An image capturing apparatus detachably attachable to a lens apparatus, which includes an image capturing optical system having a focusing lens unit, via an extender including an extender optical system, the image capturing apparatus comprising:

a focus detection circuit including a focus detection optical system and configured to perform a focus detection process by a phase detection; and a controller configured to control driving of the focusing lens unit based on a result of the focus detection process by the focus detection circuit, wherein when the lens apparatus is attached to the image capturing apparatus via the extender, the controller determines a first correction value used for correcting the result of the focus detection process based on first information regarding a diameter of a pupil of the focus detection optical system and second information regarding a diameter of a pupil of an optical system including the image capturing optical system and the extender optical system.

12. The image capturing apparatus according to claim 11, wherein when the lens apparatus is attached to the image capturing apparatus directly, the controller obtains a second correction value used for correcting the result of the focus detection process from the lens apparatus, and determines the first correction value based on the second correction value.

13. The image capturing apparatus according to claim 11, wherein the first information is the diameter of the pupil of the focus detection optical system, wherein the second information is the diameter of the pupil of the optical system including the image capturing optical system and the extender optical system, and wherein the controller determines a relationship between the diameter of the pupil of the focus detection optical system and the diameter of the pupil of the optical system including the image capturing optical system and the extender optical system, and determines the first correction value based on a determination result.

14. The image capturing apparatus according to claim 13, wherein the controller obtains a second correction value used for correcting the result of the focus detection process from the lens apparatus when the lens apparatus is attached to the image capturing apparatus directly, and obtains a third correction value in design used for correcting the result of the focus detection process, from the lens apparatus where the lens apparatus is attached to the image capturing apparatus via the extender, and wherein where $\Phi_{af}$ represents the diameter of the pupil of the focus detection optical system, $\Phi_{ext}$ represents the diameter of the pupil of the optical system including the image capturing optical system and the extender optical system, $BP_{ext}$ represents the first correction value, $BP_{tan}$ represents the second correction value, b represents the third correction value, and α represents a coefficient, the controller calculates the first correction value using an expression of $BP_{ext} = b + \alpha \times BP_{tan}$ (0<α) in a case where the controller determines that a conditional expression of $\Phi_{af} < \Phi_{ext} \times a$ (0.5≤a≤1.1) is satisfied, and calculates the first correction value using an expression of $BP_{ext} = b$ when in a case where the controller determines that a conditional expression of $\Phi_{af} > \Phi_{ext} \times a$ is satisfied.

15. The image capturing apparatus according to claim 13, wherein the controller obtains a second correction value used for correcting the result of the focus detection process from the lens apparatus when the lens apparatus is attached to the image capturing apparatus directly, and obtains a third correction value in design used for correcting the result of the focus detection process, from the lens apparatus where the lens apparatus is attached to the image capturing apparatus via the extender, and wherein where $\Phi_{af}$ represents the diameter of the pupil of the focus detection optical system, $\Phi_{ext}$ represents the diameter of the pupil of the optical system including the image capturing optical system and the extender optical system, $BP_{ext}$ represents the first correction value, $BP_{tan}$ represents the second correction value, b represents the third correction value, and $\alpha_1$, $\alpha_2$ ($0<\alpha_2<\alpha_1$) represent coefficients, the controller calculates the first correction value using an expression of $BP_{ext}=b+\alpha_1\times BP_{tan}$ in a case where the controller determines that a conditional expression of $\Phi_{af}<\Phi_{ext}\times a$ ($0.5\le a\le 1.1$) is satisfied, and calculates the first correction value using an expression of $BP_{ext}=b+\alpha_2\times BP_{tan}$ in a case where the controller determines that a conditional expression of $\Phi_{af}>\Phi_{ext}\times a$ is satisfied.

16. The image capturing apparatus according to claim 12, wherein the controller obtains a third correction value in design used for correcting the result of the focus detection process from the lens apparatus when the lens apparatus is attached to the image capturing apparatus via the extender, and wherein when $\Phi_{af}$ represents the diameter of the pupil of the focus detection optical system, $\Phi_{ext}$ represents a first diameter of the pupil of the optical system including the image capturing optical system and the extender optical system, $BP_{ext}$ represents the first correction value, $BP_{tan}$ represents the second correction value, b represents the third correction value, the controller calculates the first correction value using an expression of $BP_{ext}=b+(1-\Phi_{af}/\Phi_{ext})\times BP_{tan}$.

17. The image capturing apparatus according to claim 11, wherein the first information is an F-number corresponding to the diameter of the pupil of the focus detection optical system, wherein the second information is an F-number corresponding to the diameter of the pupil of the optical system including the image capturing optical system and the extender optical system, and wherein the controller determines a relationship between the F-number corresponding to the diameter of the pupil of the focus detection optical system and the F-number corresponding to the diameter of the pupil of the optical system including the image capturing optical system and the extender optical system, and determines the first correction value based on a determination result.

18. The image capturing apparatus according to claim 17, wherein the controller obtains a second correction value used for correcting the result of the focus detection process from the lens apparatus when the lens apparatus is attached to the image capturing apparatus directly, and obtains a third correction value in design used for correcting the result of the focus detection process when the lens apparatus is attached to the image capturing apparatus via the extender, and wherein where $F_{af}$ represents the F-number corresponding to the diameter of the pupil of the focus detection optical system, $F_{ext}$ represents the F-number corresponding to the diameter of the pupil of the optical system including the image capturing optical system and the extender optical system, $BP_{ext}$ represents the first correction value, $BP_{tan}$ represents the second correction value, b represents the third correction value, and $\alpha$ represents a coefficient, the controller calculates the first correction value using an expression of $BP_{ext}=b+\alpha\times BP_{tan}$ ($0<\alpha$) in a case where the controller determines that a conditional expression of $F_{af}>F_{ext}\times a$ ($0.9\le a\le 2.0$) is satisfied, and calculates the first correction value using an expression of $BP_{ext}=b$ in a case where the controller determines that a conditional expression of $F_{af}<F_{ext}\times a$ is satisfied.

19. The image capturing apparatus according to claim 17, wherein the controller obtains a second correction value used for correcting the result of the focus detection process from the lens apparatus when the lens apparatus is attached to the image capturing apparatus directly, and obtains a third correction value in design used for correcting the result of the focus detection process when the lens apparatus is attached to the image capturing apparatus via the extender, and wherein where $F_{af}$ represents the F-number corresponding to the diameter of the pupil of the focus detection optical system, $F_{ext}$ represents the F-number corresponding to the diameter of the pupil of the optical system including the image capturing optical system and the extender optical system, $BP_{ext}$ represents the first correction value, $BP_{tan}$ represents the second correction value, b represents the third correction value, and $\alpha_1$, $\alpha_2$ ($0<\alpha_2<\alpha_1$) represent coefficients, the controller calculates the first correction value using an expression of $BP_{ext}=b+\alpha_1\times BP_{tan}$ in a case where the controller determines that a conditional expression of $F_{af}>F_{ext}\times a$ ($0.9\le a\le 2.0$) is satisfied, and calculates the first correction value using an expression of $BP_{ext}=b+\alpha_2\times BP_{tan}$ in a case where the controller determines that a conditional expression of $F_{af}<F_{ext}\times a$ is satisfied.

20. The image capturing apparatus according to claim 12, wherein the controller obtains a third correction value in design used for correcting the result of the focus detection process from the lens apparatus when the lens apparatus is attached to the image capturing apparatus via the extender, and wherein when $F_{af}$ represents an F-number corresponding to the diameter of the pupil of the focus detection optical system, $F_{ext}$ represents an F-number corresponding to the diameter of the pupil of the optical system including the image capturing optical system and the extender optical system, $BP_{ext}$ represents the first correction value, $BP_{tan}$ represents the second correction value, b represents the third correction value, the controller calculates the first correction value using an expression of $BP_{ext}=b+(1-F_{af}/F_{ext})\times BP_{tan}$.

21. A camera system comprising:
a lens apparatus;
an extender; and
an image capturing apparatus to which the lens apparatus is detachably attached via the extender,
wherein the lens apparatus includes an image capturing optical system having a focusing lens unit and a first determination circuit configured to determine a first correction value used when a controller corrects a result of a focus detection process,
wherein the extender includes an extender optical system,
wherein the image capturing apparatus includes a focus detection circuit having a focus detection optical system and configured to perform the focus detection process by a phase detection, and the controller configured to control driving of the focusing lens unit based on the result of the focus detection process by the focus detection circuit, and wherein when the lens apparatus is attached to the image capturing apparatus via the extender, the first determination circuit determines the first correction value based on first information regarding a diameter of a pupil of the focus detection optical system and second information regarding a diameter of a pupil of an optical system including the image capturing optical system and the extender optical system.

22. A determination method that determines a first correction value used when a controller corrects a result of a focus detection process where a lens apparatus, which includes an image capturing optical system having a focusing lens unit, is attached to an image capturing apparatus, which includes a focus detection circuit having a focus detection optical system and configured to perform the focus detection process by a phase detection and the controller configured to control driving of the focusing lens unit based on the result of the focus detection process by the focus detection circuit, via an extender including an extender optical system, the determination method comprising:

obtaining first information regarding a diameter of a pupil of the focus detection optical system;

obtaining second information regarding a diameter of a pupil of an optical system including the image capturing optical system and the extender optical system; and determining the first correction value based on the first information and the second information.

23. A non-transitory computer-readable storage medium configured to store a computer program to enable a computer to perform a determination method configured to determine a first correction value used when a controller corrects a result of a focus detection process where a lens apparatus, which includes an image capturing optical system having a focusing lens unit, is attached to an image capturing apparatus, which has a focus detection circuit including a focus detection optical system and configured to perform the focus detection process by a phase detection and the controller configured to control driving of the focusing lens unit based on the result of the focus detection process by the focus detection circuit, via an extender including an extender optical system, the determination method comprising:

obtaining first information regarding a diameter of a pupil of the focus detection optical system;

obtaining second information regarding a diameter of a pupil of an optical system including the image capturing optical system and the extender optical system; and determining the first correction value based on the first information and the second information.

* * * * *